United States Patent [19]

Weaver

[11] 3,969,662

[45] July 13, 1976

[54] MEASURING THE ANGULAR POSITION OF A SHAFT

[75] Inventor: Leroy E. Weaver, Houston, Tex.

[73] Assignee: Sperry-Sun, Inc., Sugar Land, Tex.

[22] Filed: Nov. 8, 1973

[21] Appl. No.: 414,061

[52] U.S. Cl. .............................. 318/645; 318/630; 318/675; 73/418
[51] Int. Cl.² ........................................ G05D 16/00
[58] Field of Search .................. 318/675, 630, 645; 73/412, 413, 414, 415, 416, 417, 418

[56] References Cited
UNITED STATES PATENTS

| | | | |
|---|---|---|---|
| 2,035,602 | 3/1936 | Hubbard | 318/675 X |
| 2,927,257 | 3/1960 | Senseney | 318/675 |
| 3,020,458 | 2/1962 | Morgan | 318/675 X |
| 3,114,089 | 12/1963 | Mulligan | 318/675 |
| 3,395,323 | 7/1968 | Peters | 318/675 |
| 3,560,830 | 2/1971 | Steinberg | 318/630 |

Primary Examiner—Robert K. Schaefer
Assistant Examiner—John J. Feldhaus
Attorney, Agent, or Firm—Macka L. Murrah

[57] ABSTRACT

A system for measuring the rotation of a shaft without direct mechanical connection to it uses a digital system to maintain a second shaft that connects to a cylindrical chart recorder in a constant angular position relationship with the measured shaft. Two limit switches on the recorder shaft sense the rotation of a reference point on the measured shaft beyond a range defined by the location of the limit switches. A stepper motor driven by digital power supply incrementally rotates the recorder shaft to move a reference point on the recorder shaft back into alignment with the reference point on the measured shaft. A digital counter controls the number of pulses supplied by the power supply to stop the recorder shaft in the aligned position.

22 Claims, 4 Drawing Figures

MEASURING THE ANGULAR POSITION OF A SHAFT

BACKGROUND OF THE INVENTION

The invention relates to measuring the angular position of a shaft.

It is desirable in certain applications to determine the angular position of a shaft without direct mechanical connection to it. One such application is in a pressure recording system like that described in U.S. Pat. No. 3,232,115 entitled "Apparatus for Recording Pressure Conditions in Boreholes" by John D. Bennett et al, hereinafter called "the conventional pressure gauge". The conventional pressure gauge may be used to obtain records of variations of pressure in an oil reservoir. The pressure variations coupled with the history of production or other manipulations of the reservoir give valuable information as to conditions in the reservoir.

The pressure sensing element of the pressure gauge is a bellows connected to a Bourdon tube. The Bourdon tube is a flexible tube having a flattened cross section and arranged in the form of a helix. One end of the Bourdon tube is connected to the bellows, which contains a liquid. The other end of the tube is coiled around and coupled to a shaft. When the bellows is subjected to ambient pressure, the liquid transmits the pressure to the interior of the Bourdon tube. The pressure in the tube causes the flattened cross section of the tube to expand toward a circular cross section. The expansion of the tube causes the shaft connected to the free end to rotate. Thus, the rotation of the shaft is a measure of the pressure in the reservoir.

The pressure gauge uses a differential transformer to sense rotation of the shaft and the Bourdon tube. The transformer comprises an oscillator and a detector coil arranged with their axes separated by 90° in order that there will be no coupling between the two. These coils are mounted on the measuring shaft, and a flux coupler, or core piece, is mounted on the measured shaft. As long as the core piece is perfectly aligned with the oscillator coil, there is no coupling of flux between the two coils. This is the null position. When the measured shaft deviates from the null position, the core piece will cause flux coupling between the two coils. The flux coupling will cause a current to flow in the detector coil and associated circuitry, the amplitude and phase indicate the position of the measured shaft with respect to the null position. A motor directed by a control system uses this information to drive the coil assembly back to the null system.

The motor in the control system also connects by reduction gearing to a stylus on a rotatable shaft in a cylindrical recording device. The stylus scribes on a recording surface that is constructed in the form of a cylinder, about the stylus shaft. The stylus shaft is provided with means to allow the stylus to travel up and down the length of the cylindrical recording surface as the shaft turns. Thus, as the shaft turns the stylus will scribe a helical mark on the recording surface.

When the Bourdon element senses a change in pressure the Bourdon shaft will rotate. The control system will follow the movement of the Bourdon shaft and maintain a null, or reference, position. The rotation of the measuring shaft is transmitted via the gearing system greatly magnifies the movement of the Bourdon shaft and thus a small movement in the Bourdon shaft may cause many rotations of the stylus shaft. The pressure change can be computed by counting the number of whole and partial helical scribes on the recording surface. The accuracy of the pressure gauge is increased by causing the movements of the stylus to its recording positions to take place in only one direction. This eliminates a gear backlash resulting from imperfect meshing of the teeth in the gearing mechanism.

Although the pressure gauge provides a novel solution to the problem of sensing pressure with a Bourdon tube, there are several ways in which this operation can be improved. The pressure gauge uses a standard DC type motor that, as is well known in the art, has a small number of bars on the commutator, which limits the number of positions in which the motor rotor may stop. Further there are the drawbacks of limited brush life and brush noise on the power lines. In addition, the differential transformer and its control circuitry consumes a relatively large amount of power.

SUMMARY OF THE INVENTION

It is therefore an object of the invention to provide an improved shaft-position measuring system.

Another object of the invention is to increase the accuracy of a system that measures the rotation of a shaft by providing a larger number of motor stop positions.

Another object of the invention is to reduce the required maintenance in a shaft rotation measurement system by using a brushless stepper motor.

Another object of the invention is to reduce the noise level in the electrical information carrying portions of a shaft rotation measurement system by using a brushless stepper motor.

A futher object of the invention is to reduce the amount of electrical power required to operate a shaft rotation measurement system by using digital circuitry.

With these and other objects in view, the invention contemplates using digital methods to measure the rotation of a shaft. Sensing devices sense the rotation of the measured shaft to the limits of a range of relative rotation between the shaft and a rotatable member that is spaced from the shaft. When the measured shaft rotates to a range limit, a motive device rotates the rotatable member a fixed number of incremental steps to a reference position with respect to the measured shaft.

In another aspect, the invention may include a clock device to periodically cause the support member to rotate to a range limit to correct changes resulting from small variations in the position of the shaft.

DESCRIPTION OF THE PREFERRED EMBODIMENTS

Figures 1, 1A:
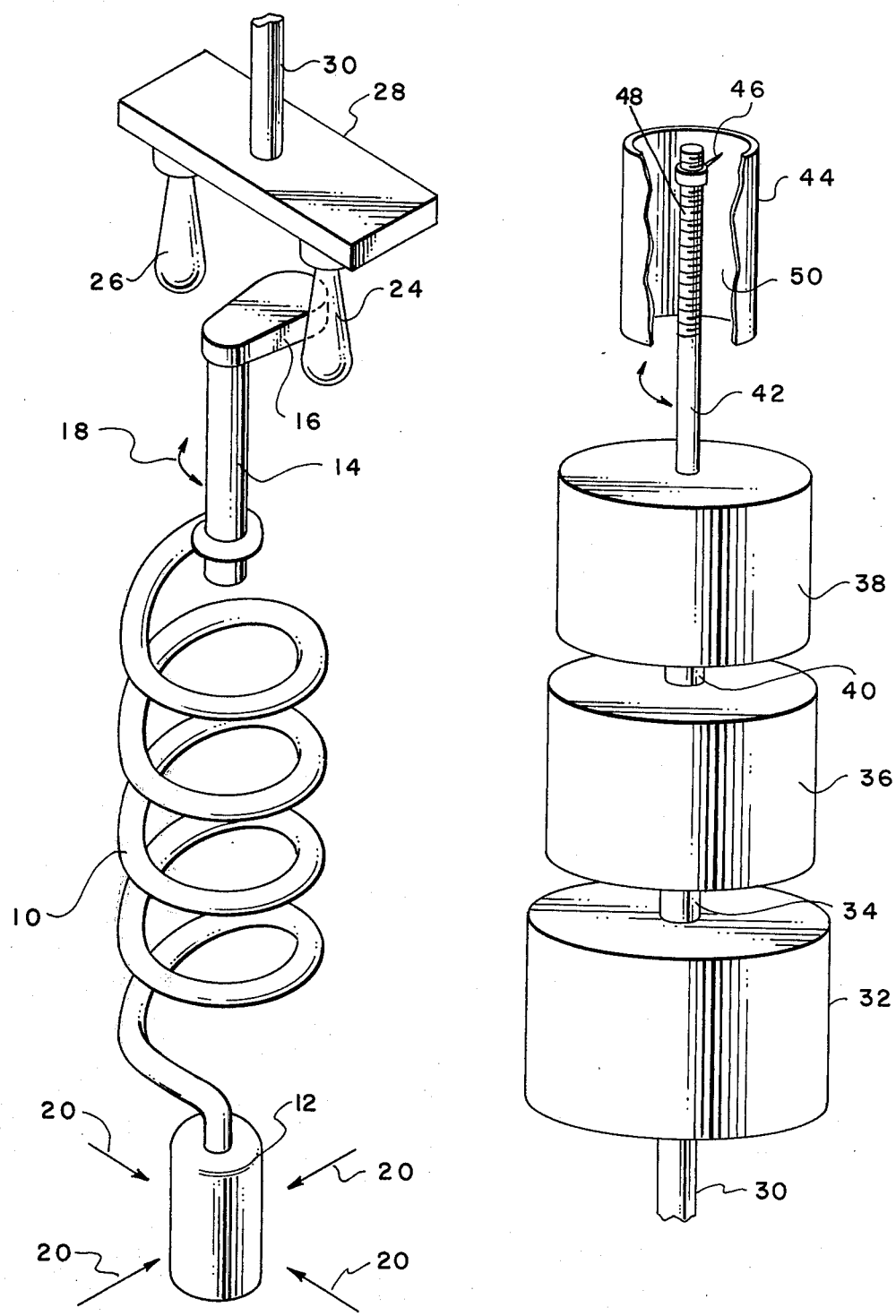
FIGS. 1 and 1A are a perspective view of the mechanical portion of the invention in a pressure measuring and recording device.

FIGS. 1 and 1A show a pressure measuring and recording system in which the invention may be used. A Bourdon tube 10 has attached at its lower end a flexible fluid-filled bladder 12 and at its upper end a shaft 14.

At the upper end of the shaft 14 is a cam 16. In operation the Bourdon tube and associated apparatus are placed in an area having an unknown pressure, such as the bottom of a borehole in an oil reservoir. The pressure in the reservoir represented by arrows 20 compresses the bladder 12 and forces the fluid in the bladder upward into the tube 10. The tube 10 expands with a twisting motion causing shaft 14 and cam 16 to rotate as indicated by arrow 18. Conversely if the pressure decreases, the bladder 12 will expand, and the fluid will return to the bladder from the tube 10. The tube 10 will relax with the same twisting motion, and the shaft 14 and cam 16 will rotate in the opposite direction.

As the cam 16 rotates, it will actuate sensing devices such as limit switches 24 and 26. The limit switches may be mechanical, electrical, magnetic, optical, or the like. The switch that the cam actuates depends upon its direction of rotation. One of the limit switches 24 is designated the upper limit switch, and the other 26 is designated the lower limit switch. The two limit switches define respectively the upper and lower limits of a range of rotation of a shaft 14 and cam 16. The limit switches 24 and 26 may be attached to a rotatable member, or support, 28 on a rotatable shaft 30. Alternatively the switches and support may be attached to the measured shaft 14 and the cam to shaft 30. The shaft 30 connects to a gear assembly 32 that attaches to a motor 36 by means of a shaft 34. Motor 36 connects to a gear assembly 38 by means of shaft 40. The gear assembly 38 connects via a shaft 42 to a cylindrical chart recording mechanism 44. The recorder 44 contains a stylus 46 on a threaded portion 48 of shaft 42. The stylus 46 scribes on a cylindrical recording surface 50.

When the cam 16 contacts either the upper limit switch 26 or the lower limit switch 24, electronic circuitry to be described later causes the motor 36 to reorient the shaft 30 into an aligned, or reference position, with respect to shaft 14. Due to the presence of the gear assembly 32 between the motor 36 and the shaft 30, motor 36 will rotate many times in order to turn the shaft 30 a small portion of a single revolution.

As the shaft 30 realigns with shaft 14, shaft 30 transmits the motion of the motor 36 via gear assembly 38 to shaft 42 in the cylindrical recorder. The gear assembly 38 reduces the rate of rotation of shaft 42 relative to that supplied by the motor 36. The reduction ratio of gear assembly 38 is less than that of gear assembly 32, so that the shaft 42 will rotate several complete revolutions for many turns of the motor 36, while shaft 30 turns only a small portion of a single revolution. As shaft 42 rotates, the stylus 42 both rotates about the shaft 42 and either advances downward or ratchets on shaft 42, depending upon the direction of rotation of the shaft. In so doing the stylus 46 scribes a helical mark on the recording surface 50. As discussed above in the Background of the Invention, the number of horizontal marks represents the degree of pressure change sensed by the Bourdon tube in the borehole.

Figure 2:
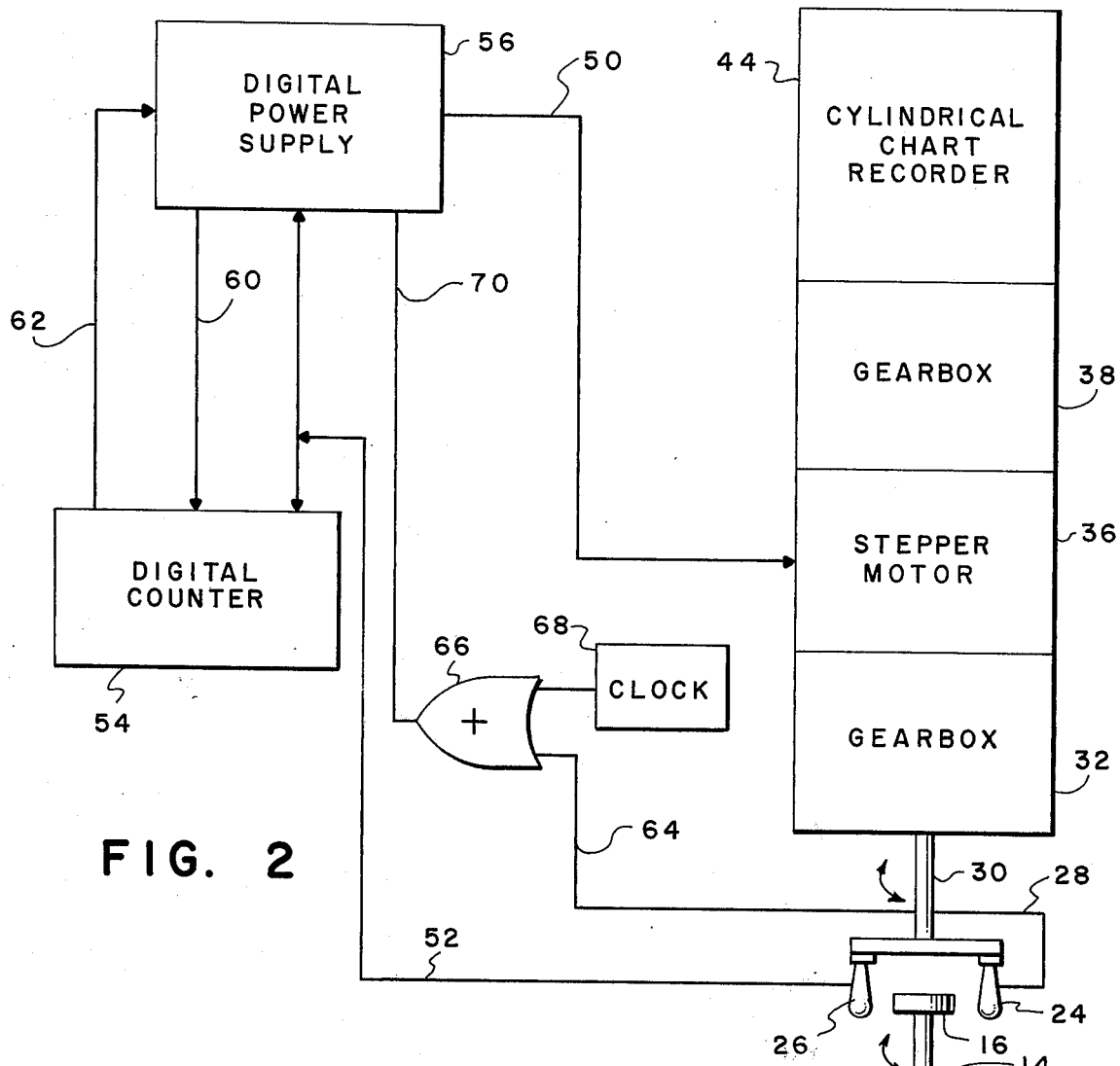
FIG. 2 is a schematic representation of both the mechanical and electrical components of the invention in a pressure measuring system.

FIG. 2 illustrates an electrical circuit that may be used to practice the invention. When the Bourdon device 10 senses an increasing pressure, shaft 14 will rotate cam 16 into contact with upper limit switch 26. The switch 26 closes a circuit that sends an upper limit signal 52 to both a digital counter 54 and a digital, or pulse power supply 56. The power supply 56 is capable of producing signal that will operate the stepper motor 36 in either a forward or reverse direction. The upper limit signal resets the digital counter 54 to a zero count and turns on the digital power supply 56. The digital power supply 56 begins to send a digital power signal 58 to a reversible, brushless stepper motor 36, which operates in incremental steps. The motor reorients the support 28 and the limit switches 24 and 26 with respect to the cam 16. The digital power supply 56 also sends a counter signal 60 to the digital counter 54. The counter 54 counts the pulses emitted by the digital power supply 56 until it reaches a predetermined number. This predetermined number corresponds to the number of steps that the shaft 30 has to rotate from a limit switch, preferably the upper limit switch 26, in order to regain alignment with the shaft 14 and cam 16. When the digital counter 54 reaches the predetermined number, it sends a stop signal 62 to the digital power supply, which ceases the transmission of the power signal 58 to the stepper motor 36.

When the Bourdon device senses a decreased pressure, the cam 16 will rotate into contact with the lower limit switch 24, which will close a circuit and transmit a lower limit signal 64 to an OR gate 66. There may also be connected to the OR gate 66 a clock signal generator 68 which will be discussed in further detail later. When the OR gate 66 receives an input signal from either the lower limit signal 64 or the clock 68, it sends a start signal 70 to the digital power supply 56. The digital power supply transmits a power signal 58 to the stepper motor 36 that causes the motor to operate in the direction opposite of that when stimulated by an upper limit signal. The stepper motor 36 causes the support 28 and limit switches 24 and 26 to rotate through the range defined by the two limit switches and to contact the upper limit switch 26. The upper limit switch 26 causes the series of events described in the previous paragraph to occur. As is thus obvious the alignment position is preferably always referenced with respect to one of the limit switches, for example, the upper limit switch 26. This is done in order to eliminate the effects of gear backlash as previously discussed.

To this point the operation of the system has assumed that the cam 16 will rotate sufficiently to contact one of the two limit switches 24 and 26. However, the change in pressure sensed by the Bourdon device 10 may not be sufficient to rotate the cam 16 to that extent. To provide corrections for such small variations in pressure, the system may include means for intermittently re-referencing the support 28. One type of device to accomplish this is a clock signal generator 68 that may be attached to the input of OR gate 66. The clock provides a periodic signal to the OR gate to simulate the cam 16 contacting the lower limit switch 24. When this occurs, the digital power supply causes the stepper motor 36 to rotate the upper limit switch 26 into contact with the cam 16, and thus begins the re-referencing process as described above.

Figure 3:
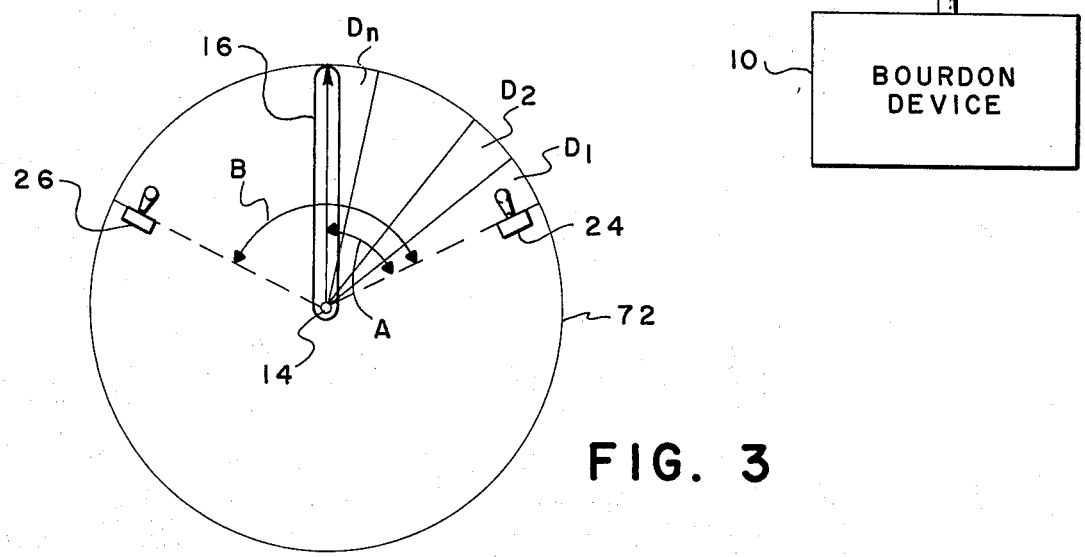
FIG. 3 is a cross sectional view of the measured shaft geometrically representing an aspect of the theory of the invention.

FIG. 3 illustrates the alignment process in geometrical terms. Circle 72 represents the potential circle of rotation of the cam 16. Angle B is the actual range of rotation of the cam 16 as defined by the upper limit switch 26 and the lower limit switch 24. Angle A is the angle of relative rotation between the upper limit switch 26 and the cam 16 necessary to bring the shaft 30 of the measuring device into alignment with the shaft 14 of the measured device (see FIG. 1A). As previously described, the alignment position is preferably always determined with reference to the upper limit switch 26. Thus if the cam 16 moves clockwise in FIG. 3, it will contact the upper limit switch 26, and the alignment process will begin. If the cam 16 moves in a counterclockwise direction, it will contact the lower limit switch 24. The circuitry will then cause support 28, to which limit switches 24 and 26 are attached (see FIG. 1A), to rotate in a clockwise direction until cam 16 contacts the upper limit switch 26 to begin the alignment process. If the cam 16 does not rotate sufficiently to contact either of the two limit switches within the period of the clock 68 (see FIG. 2), the clock will activate the circuitry and cause the support 28 and limit switches 24 and 26 to rotate in a clockwise direction until cam 16 contacts the upper limit switch 26 and thus begin the alignment process.

The alignment process consists of rotating the support 28 and limit switches 24 and 26 in incremental steps in a counterclockwise direction beginning preferably at the upper limit switch 26 and continuing until cam 16 and support 28 are in the aligned position. This corresponds to a relative movement of the cam and support through A degrees. The size of the steps taken by the support 28 depends upon the characteristics of the stepper motor 36 and gear assembly 32 (see FIG. 2). Once the size of these incremental steps designated D in FIG. 3 is determined, the alignment position is determined by dividing the angle A by the angle D of each individual incremental step. This will yield the number of steps that the support 28, and thus the motor, must take in order to bring the two shafts into alignment. The number of steps this calculated is the number that is entered into the digital counter 54 (see FIG. 2) in order to determine when to stop operation of the digital power supply.

While particular embodiments of the present invention have been shown and described, it is apparent that changes and modifications may be made without departing from the invention in its broader aspects, and therefore the aim in the appended claims is to cover all such changes and modifications that fall within the true scope and spirit of the invention.

What is claimed is:

1. In a borehole-pressure recorder, apparatus for measuring the rotation of a shaft about its longitudinal axis, said rotation corresponding to borehole pressure levels, comprising: a centrally rotatable member spaced from the shaft; means for sensing relative rotation between the rotatable member and the shaft from a reference relationship position to limit relationship positions that are angularly spaced from the reference relationship position; reversible means for rotating the rotatable member back toward the reference relationship position in incremental steps in response to the sensing means; and means for controlling the number of steps taken by the rotating means, whereby the rotatable member may cease to rotate when it reaches the reference relationship position.

2. The apparatus of claim 1 further including means for intermittently rotating the rotating means to a limit relationship position, whereby small variations from the reference relationship position may be corrected.

3. The apparatus of claim 1 wherein the sensing means comprises: limit switch means; and means for activating the limit switches.

4. The apparatus of claim 3 wherein limit switch means comprises two limit switches angularly spaced from each other to define a range within which the rotatable member and the shaft may relatively rotate.

5. The apparatus of claim 4 wherein the activating means is a cam.

6. The apparatus of claim 1 wherein the rotating means comprises: a pulse power supply in circuit with the sensing means; and a reversible motor operable in steps, the motor being in circuit with the power supply.

7. The apparatus of claim 1 wherein the controlling means comprises: a digital counter in circuit with the sensing means and the power supply.

8. The apparatus of claim 2 wherein the intermittent rotating means comprises a clock signal generator in circuit with the power supply.

9. In a pressure recorder, apparatus for measuring the rotation of a shaft about its longitudinal axis comprising: a centrally rotatable member spaced above the shaft; an upper limit switch on the rotatable suppor means; a lower limit switch on the rotatable support means; and angularly spaced from the upper limit switch; a cam on the shaft mounted to engage the upper and lower limit switches; a reversible motor operated in steps connected to the rotatable means; a pulse power supply in circuit with the upper and lower limit switches and the motor, the power supply supplying the motor a forward power signal in response to the upper limit switch and a reverse power signal in response to the lower limit switch; and a digital counter in circuit with the power supply and the upper limit switch.

10. The apparatus of claim 9 further including a clock signal generator in circuit with the power supply and the lower limit switch.

11. Apparatus for measuring the angular position of a shaft, comprising: a rotatable centrally member spaced from the shaft; means for sensing rotation of a point on the shaft to a first limit of a range of relative rotation between the shaft and the rotatable member; means for sensing rotation of the point to a second limit of the range of relative rotation; first means for rotating the support means to the first limit in response to the second limit sensing means; and second means for rotating the support means a fixed number of incremental steps from the first limit sensing means toward the second limit sensing means, whereby a reference position may be attained.

12. The apparatus of claim 11 wherein the first and second sensing means comprises: a first limit switch on the rotatable member; a second limit switch on the rotatable member and angularly spaced from the first limit switch; and a cam on the shaft arranged to engage the first and second limit switches.

13. The apparatus of claim 11 wherein the first rotating means comprises: a pulse-powered stepper motor connected to the rotatable member; and a pulse power supply in circuit with the motor and the second limit sensing means, the power supply being capable of providing forward and reverse driving signals for the motor.

14. The apparatus of claim 13 wherein the second rotating means comprises a digital counter in circuit with the power supply and the first limit sensing means.

15. The apparatus of claim 14 further including third means for rotating the support means to the first limit sensing means at intermittent intervals.

16. The apparatus of claim 15 wherein the third rotating means comprises a clock signal generator in circuit with the power supply and the first limit sensing means.

17. A method of measuring the angular position of a shaft in a plane perpendicular to its longitudinal axis, comprising the steps of: sensing the relative rotation of the shaft from a reference relationship position with a second shaft to a limit relationship position that is a fixed angular distance from the reference relationship position; rotating the second shaft in incremental steps toward the reference relationship position; and limiting the number of steps taken by the second shaft to a number required to regain the reference relationship position.

18. The method of claim 17 further including the step of intermittently rotating the second shaft to the limit relationship position.

19. A method of measuring the angular position of a shaft in a plane perpendicular to its longitudinal axis, comprising the step of: sensing the relative rotation of the shaft from a reference relationship position with a second shaft to an upper limit relationship position that is a fixed angular distance from the reference relationship position; supplying a forward pulse signal to a stepper motor in response to sensing the upper limit relationship position; operating a stepper motor that is connected to the second shaft in a forward direction in response to the forward pulse signal; rotating the second shaft in incremental steps in a forward direction; counting the number of pulses contained in the forward power signal; and ceasing to supply the forward pulse signal when the number of pulses reaches a fixed number.

20. The method of claim 19 further including the steps of: sensing the relative rotation of the shaft from the reference relationship position with the second shaft to a lower limit relationship position that is a fixed angular distance from the reference relationship position; supplying a reverse pulse signal to the stepper motor in response to sensing the lower limit relationship position; operating the stepper motor in a reverse direction in response to the reverse power signal; and rotating the second shaft until the upper limit relationship position is sensed.

21. The method of claim 20 further including: supplying a clock signal at intermittent intervals; and supplying the reverse pulse signal to the stepper motor in response to the clock signal.

22. In a pressure recorder, apparatus for measuring the rotation of a shaft about its longitudinal axis, comprising: a centrally rotatable member spaced from the shaft; means for sensing relative rotation between the rotatable member and the shaft from a reference relationship position to limit relationship positions that are angularly spaced from the reference relationship position; reversible means for rotating the rotatable member back toward the reference relationship position in incremental steps in response to the sensing means; and means for controlling the number of steps taken by the rotating means, whereby the rotatable member may cease to rotate when it reaches the reference relationship position.

* * * * *